July 8, 1930. B. M. BOGOSLOWSKY 1,769,914
MATCH SPLINT MACHINE
Filed May 28, 1927
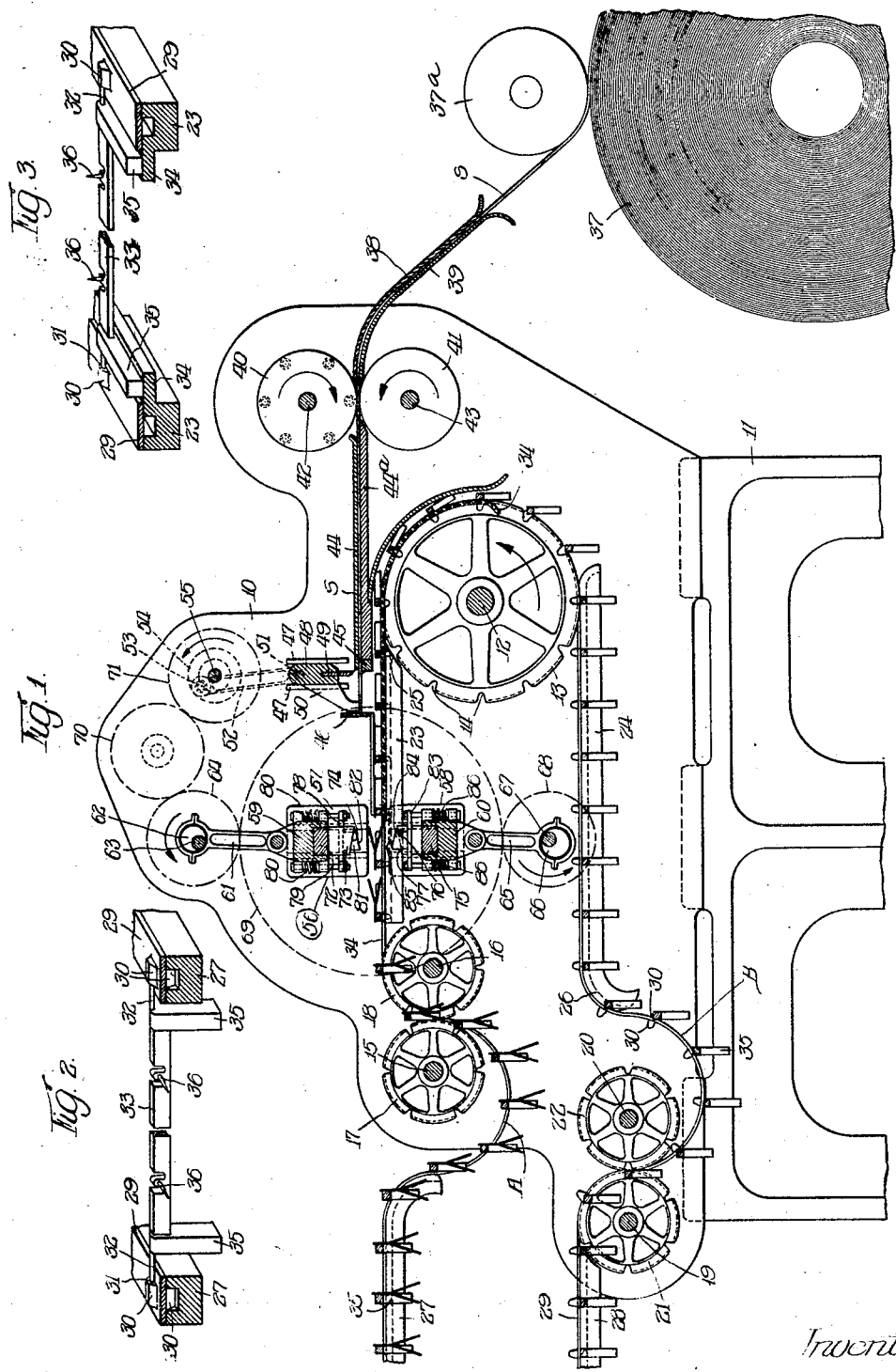
Witness:
P. Burkhardt.
Inventor:
Boris M. Bogoslowsky,
By Wilkinson Hurley Byron & Knight Attys.

Patented July 8, 1930

1,769,914

UNITED STATES PATENT OFFICE

BORIS M. BOGOSLOWSKY, OF FERGUSON, MISSOURI, ASSIGNOR, BY MESNE ASSIGNMENTS, TO THE UNIVERSAL MATCH CORPORATION, A CORPORATION OF DELAWARE

MATCH-SPLINT MACHINE

Application filed May 28, 1927. Serial No. 194,989.

This invention relates to a machine for making cards of match splints of the type employed for making books of paper matches, from a continuous strip of stock material.

My invention relates particularly to a machine which employs reciprocating cutting elements operating to cut continuous strip stock into individual strips, equal in size to a plurality of match book cards and applying them to an intermittently moving conveyor during a single operation and subsequently cutting and displacing the individual splints of said cards while they are attached to the conveyor; and also, causing said conveyor to proceed through mechanism for applying paraffin and head material to the ends of the splints so formed, and subsequently, through a dryer by continuous motion with provisions for driving that part of the conveyor continuously and the part adjacent the cutters intermittently.

Accordingly, it is one of the objects of my invention to provide a machine of the above described type in which a conveyor has a portion in motion at a continuous rate of travel and another portion moving intermittently.

Another object of my invention is to provide a reciprocating cutting element for engaging continuous strip stock to cut it into individual strips of match cards and fix them on carrying elements of a conveyor in a single operation.

Another object of my invention is to provide reciprocating cutters which are capable of operating on the individual cards for cutting the splints and displacing them in alternate directions without displacing the cards bodily, whereby this operation can be effected while the cards are being carried by the conveyor.

Another object of my invention is to provide a conveyor which is capable of assuming the driving relationship with the sprocket, with either face in contact with the sprocket.

Another object of my invention is to provide in combination with the reciprocating cutters, means for stripping the cut match splints from the cutting elements, whereby the cutting elements may be withdrawn from the splints without displacing them during the retrograde movement of the cutters.

My invention is an improvement on the match splint forming machine disclosed in the patent to Ferretti No. 1,605,336 issued November 2, 1926, employing a conveyor having swinging carriers, but embodying differences in the type of cutting means and also in the details of construction.

These and other objects are accomplished by means of the arrangement disclosed on the accompanying sheet of drawings in which—

Figure 1 is a fragmentary side elevation partially in cross section of a machine constructed in accordance with my invention.

Figure 2 is a perspective view of my conveyor and carriers in a position which they assume in passing over the conveyor guide 27 shown at the left hand side of Figure 1.

Figure 3 is a fragmentary perspective view partially in cross section of the conveyor and carriers horizontally disposed as positioned during their path of travel under the reciprocating cutting elements.

The various novel features of the invention will be apparent from the following description and drawings and will be particularly pointed out in the appended claims.

Referring to the drawing, it will be noted, that my invention relates to a machine having a frame 10 mounted on a stand 11 and in which the shaft 12 is journaled.

Mounted on the shaft 12 is an idle sprocket 13 having teeth receiving openings 14 in its periphery. At the opposite end of the frame 10 are two pairs of shafts, first 15 and 16 carrying pulleys 17 and 18 adapted to cooperate with the upper run of the conveyor and secondly, shafts 19 and 20 carrying pulleys 21 and 22 respectively, adapted to cooperate with the lower run of the conveyor belt.

Positioned tangentially to the periphery of and at points diametrically opposite the idler 13 are conveyor guides 23 and 24 positioned in parallel relation, the guide 23 having an arcuate end 25 which is positioned closely adjacent to the periphery of the idler, and the guide 24 has a downwardly curved end 26 to properly guide the conveyor into position.

To the left of the machine as shown in the figure, are guides 27 and 28 which carry the conveyor belt and which form parts of an elongated dryer, paraffin applying, and head material applying machine, not disclosed, but which may be of any suitable construction as for instances, that shown in the Ferretti patent above referred to.

It is to be understood that the guides 23, 24, 27 and 28 are positioned in spaced relation, one each supporting a flexible steel belt 29 having spaced along its length, tooth elements 30 on opposite sides thereof, the teeth on one side being drilled as at 31 to receive the trunnion 32 of the swinging carriers 33 which bridges the space between the flexible strips 29 of the conveyor and the guides in spaced relation referred to, in the manner shown in Figure 2.

Referring to Figure 3, it will be noted that the conveyor element 23 is provided with a flange 34 adapted to engage the weights 35 on the swinging carriers, whereby carriers will be held in horizontal position during the portion of its travel where the conveyed cards are operated upon by the reciprocating cutting elements.

Attention is directed to the pins 36 provided on the carriers in such a manner that they project upwardly when the carriers are in horizontal position as when passing under the reciprocating cutting elements and as shown in Figure 3. Mounted at the right hand end of the machine is a roll of paper stock 37 mounted in a suitable stand so that the leading edge may be passed under the roll 37ª and introduced between the guides 38 and 39 so as to be presented to the feed rollers 40 and 41 which rotate in the directions indicated by the arrows. These rollers are mounted on the shafts 42 and 43 respectively, which are driven with intermittent motion through suitable mechanism not shown, but which may be of any of the well known mechanical movements for effecting such a drive.

The paper stock fed by the rollers is next introduced between the guide plates 44 and 44ª the latter of which has at one end a shirring plate 45. Provided at a point spaced from the ends of the guide plates 44 and 44ª is a stop element 46 which is positioned in the path of the advancing paper so as to form a stop, therefore, in a manner to determine the amount of stock which will project beyond the shirring plate 45. Mounted in the frame 10 are two guide ribs 47 having a reciprocating block 48 slidably mounted therebetween, the lower end of which carries the cutting blade 49 adapted to cooperate with the shirring plate 45. The reciprocating block 48 has an arm 50 projecting from one side thereof and presenting a portion in engagement with the leading edge of the stock in a manner to cause the leading edge to be introduced onto the pins 36 of the swinging carriers when the reciprocating element 48 is lowered during operation. The reciprocating element 48 is provided with a pivot 51 at its upper end for connection with the pitman 52 which is driven by the eccentric connection 53 on the wheel 54 mounted on the shaft 55.

From the description thus far, it can be seen that as the paper stock is fed from the roll plate 36 and from the shirring plate 45, that the portion so positioned is cut by the reciprocating blade 49 and forced during this movement, downwardly, and is introduced onto the pins 36 of the conveyor, the carriers of which at this point of travel are horizontally disposed as shown in Figure 3.

Attention is directed to the fact that the various parts are driven in synchronism so that the reciprocating knife operates during the period at which the feed mechanism of the stock is at rest. The cards thus formed and introduced onto the conveyors are slightly spaced due to the spacing of the carriers on the conveyor. After receiving the cards, the conveyor moves in a manner to bring them between the reciprocating splint cutting mechanism, designated generally 56. The splint forming mechanism is designed to operate upon the individual match cards while they are positioned on and are being conveyed by the carriers and consequently must be of the type that will not displace the cards bodily during the cutting operation.

Accordingly, I have provided upper and lower cutting elements which cooperate, both of which reciprocate. This mechanism comprises an upper guide 57 and a lower guide 58 in which are mounted the reciprocating heads 59 and 60 respectively. The upper head is operated by a pitman 61 and eccentric 62 operated by means of the shaft 63 and gear wheel 64. The lower head is reciprocated by means of the pitman 65, eccentric 66 operated by the shaft 67 and gear wheel 68. The gear wheels 64 and 68 are connected by means of a large intermediate gear 69 which operates to drive both of the driven gears in the same direction.

It will be noted that there is an idler 70 provided between the gear 64 and the gear 71 mounted on the shaft 55 to effect a drive for the reciprocating knife 49. Mounted on the upper reciprocating head 59 is the upper die 72 having depending cutting plates 73 equal in width to one match splint and having an angular cutting face 74 of such shape that it will act to displace the cut splint in a manner desired in forming the individual cards with alternate spaced splints as is necessary in the subsequent treating process. In like manner the lower head 60 has a die 75 with cutting elements 76 having angular faces 77, the cutting elements of the upper and lower devices being in staggered relation so that they will be interdigitated when in cooperating relationship. Attention is directed to the fact that the space between each of the cutting blades is just equal to the blade itself or in other words, to the width of the individual match splints so that when the upper and lower blades cooperate, the blades of each die exactly fill the space of the opposite die.

Positioned between the cutting element of the upper head is the resiliently mounted frame element 78, carried by rods 79 and held on the reciprocating head 59 in a resilient manner by means of the spring 80. The frame 78 is provided with an extractor finger 81 having an angular edge 82 exactly similar to that of 77 on the lower cutting element 76. An extractor finger 81 is provided in a space between each of the cutting elements 73 across the width of the die 72 so that there will be a yielding extractor in cooperation with each of the cutting elements 76 on the lower cutting die 75. In a like manner a frame 83 is provided on the lower die, carrying extractors 84 with angular faces 85 and resiliently mounted by means of the springs 86 so as to cooperate with the cutting elements 73 on the upper die 72.

Referring now to the cooperating gears 17 and 18 which engage the conveyor belt 29 on opposite sides, these sprockets are driven by suitable mechanism not shown, for imparting intermittent motion thereto, whereas, the lower sprockets 21 and 22 are driven at a continuous rate of speed. Attention is also directed to the fact that the conveyor belt is of such length and is so positioned between the pulleys 17, 18, 21 and 22 that slack is provided, immediately at the left hand side of the pulleys 17 and 18 as shown at A and also at the right hand side of the drive pulleys 21 and 22 as shown at B.

Inasmuch as the continuous feed through the dryer is accomplished by the continuous feeding operation of the pulleys 21 and 22, the belt is fed through to the right hand side of these pulleys at a continuous rate and the belt is pulled at a continuous rate throughout its entire length all the way to the slack provided at A. The pulleys 17 and 18 which provide a period of rest equal in time to that of the driving period, must during their driving operation rotate or feed at twice the rate at which the pulleys 21 and 22 feed, consequently, the total length of belt fed in a unit of time is the same for both, for equal periods of time, it being understood that the slack provided at A and B makes the combination of continuous and intermittent feed possible.

In operation, the stock S is fed from the supply roll 36 by means of feed rollers 41 and 42 and introduced between the guide elements in a manner to present a small portion in a relation projecting beyond the shirring plate 45 in a manner to be engaged by the reciprocating knife 49. In this position the machine is so timed as to bring the stock S to rest at which time by means of the synchronized drive the cutting blade 49 together with the arm 50 are lowered, causing the length of one match card at the end of the stock to be cut off from the strip and introduced at its edge on the pins 36 of the conveyor which are at this point of their travel horizontally disposed. The conveyor then through its intermittent movement advances so that each card is brought between the upper and lower cutting elements shown at 56 and in this position are brought to rest whereby by the synchronized drive the cutting elements are caused to operate to form the individual match splints.

Attention at this point is directed to the operation of the extractors which are very important in this operation in that the reciprocating cutters on their retrograde movement do not cause the individual splints to be displaced and further, that this mechanism renders it possible to maintain the cards in relative spaced relation on the individual carriers without effecting a displacement thereof in either direction. From this point, the conveyor passes through the intermittently driven feeding pulleys 17 and 18, each of which cooperates with the teeth 30 disposed on opposite sides of the belt so as to pass the belt therebetween to the other side, where the continuous feed commences. From this point on, the carriers are free to swing downwardly, the carrier arms being free of the shelf 34 shown in Figure 3 and are permitted to travel in the manner shown in Figure 2. In this position the individual splints are adapted to be passed through suitable mechanism for applying the paraffin and head material and thence through a dryer of suitable length, after which the cards are extracted from the carriers in any desired manner and the conveyor is returned and passed through the feed pulleys 21 and 22 to repeat the operation. From this point on, the conveyor is fed through the loop providing slack at B and onto the guide element 24 and is returned to the idler sprocket 13 where the operation is duplicated.

It is to be understood that my machine may be of any desired width and accordingly, match cards of a length sufficient to make any desired number of match books may be formed, this provision only necessitating changes in degree that do not in any way effect the processes of the operation.

I claim:

1. In a machine for making cards of match splints, the combination of a conveyor having swingable carriers adapted to receive individual cards of material, means for intermittently driving said conveyor and means for introducing cards of material thereon and forming them into cards of match splints when said carriers and cards are in one plane and means permitting said carriers and cards to move to a plane at right angles to said first mentioned plane, for subsequent treatment of said cards of match splints.

2. In a machine for making cards of match splints, means for intermittently advancing a conveyor and a strip of stock material simultaneously, and along spaced parallel paths, an element operative during the period of rest of said stock and conveyor, moving in a path perpendicular the paths of said stock and conveyor, to successively cut said stock into individual cards and displace each bodily during the cutting operation onto said conveyor.

3. In a machine for making cards of match splints, the combination of intermittently advanced strip of stock and a conveyor, reciprocating means for successively cutting individual cards from said strip of stock a shear plate cooperating with said reciprocating means, and means spaced from said shear plate positioned in the path of said advancing stock and acting as a stop, to determine the length of each portion cut from said strip, and means operating with said reciprocating means for bodily displacing said cards during the cutting operating onto said conveyor.

4. In a machine for making cards of match splints, a conveyor comprising a pair of spaced flexible elements having sprocket teeth positioned in spaced relation on both faces thereof, the teeth on one face having bores therein for supporting carriers between said spaced flexible elements.

5. In a machine of the character described, an intermittently advancing conveyor adapted to convey uncut cards of material, cutting means located at a station of said conveyor, having cooperating means located on opposite sides of said conveyor adapted to reciprocate toward and away from each other and active to cut said cards to form cards of match splints therefrom.

6. A machine for making cards of match splints comprising a conveyor which moves with continuous motion during a portion of its travel and with intermittent movement during a portion of its travel, said conveyor being adapted to receive and carry cards of match splints, reciprocating cutting mechanism positioned adjacent said conveyor at the portion of its travel where intermittent motion occurs, and means for feeding a strip of stock to said cutting mechanism, said cutting mechanism having movement in operation serving to cut individual cards from said strip of stock and applying each cut card to said conveyor by further movement after the cutting operation.

Signed at St. Louis, Missouri, this 25th day of May, 1927.

BORIS M. BOGOSLOWSKY.